W. H. BIGELOW.
REFRIGERATING CONCENTRATOR FOR FRUIT JUICES.
APPLICATION FILED JULY 29, 1918.
1,330,160.
Patented Feb. 10, 1920.
3 SHEETS—SHEET 1.
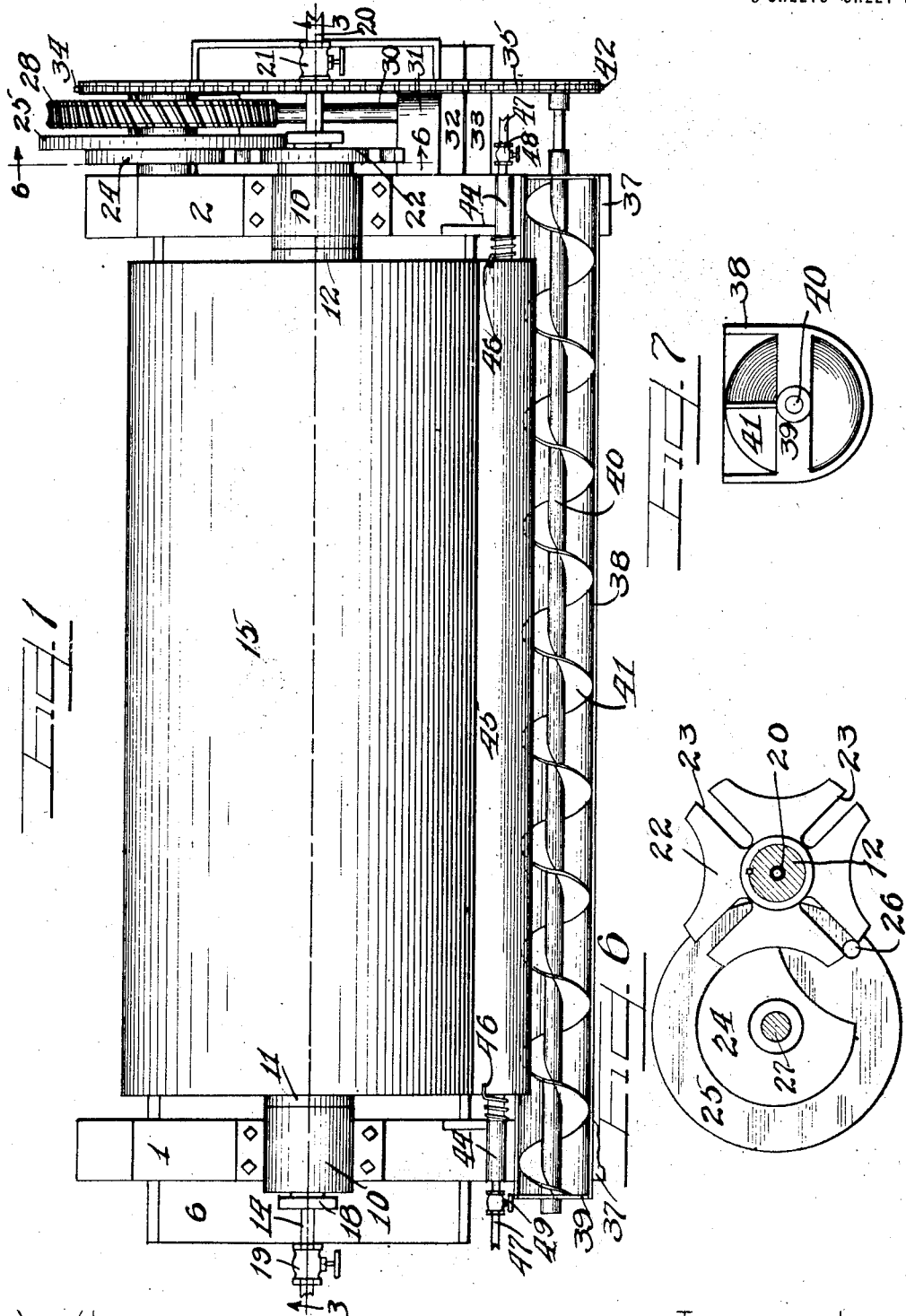

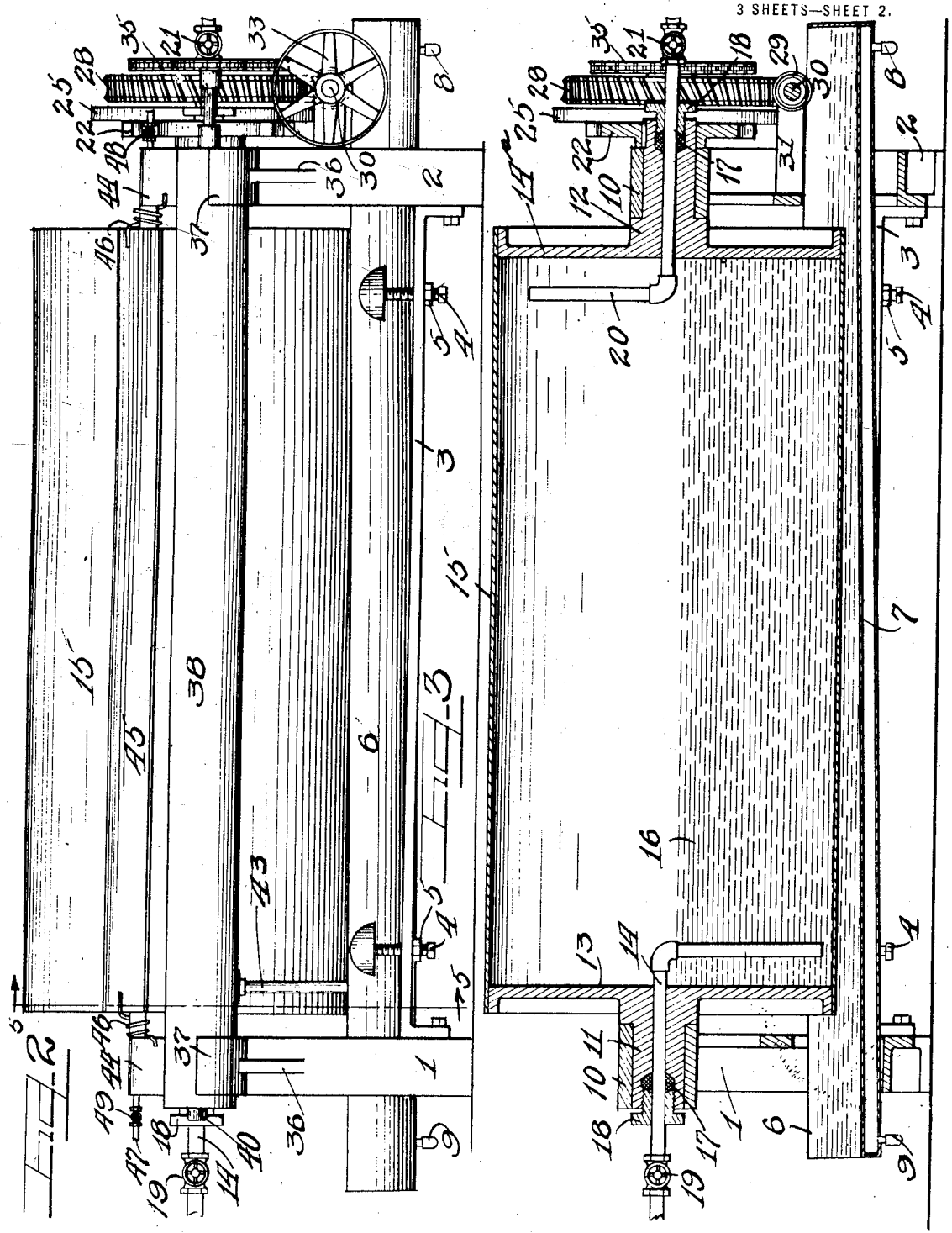

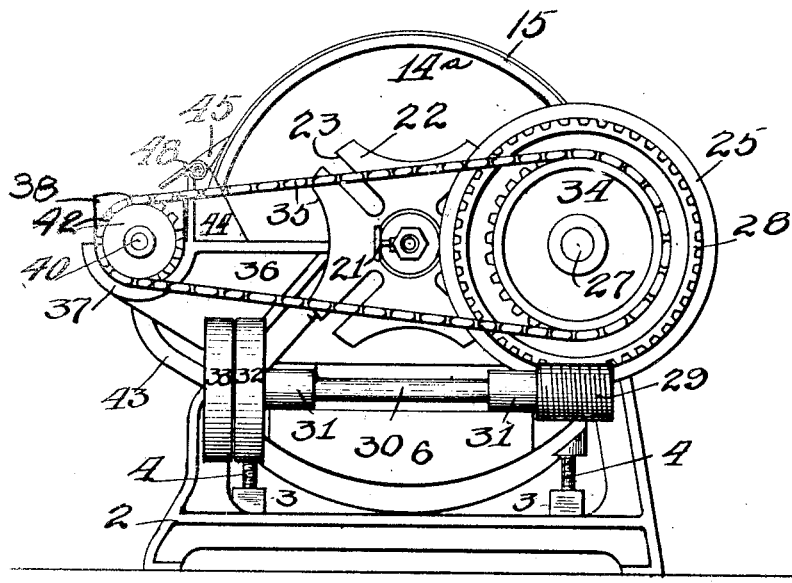
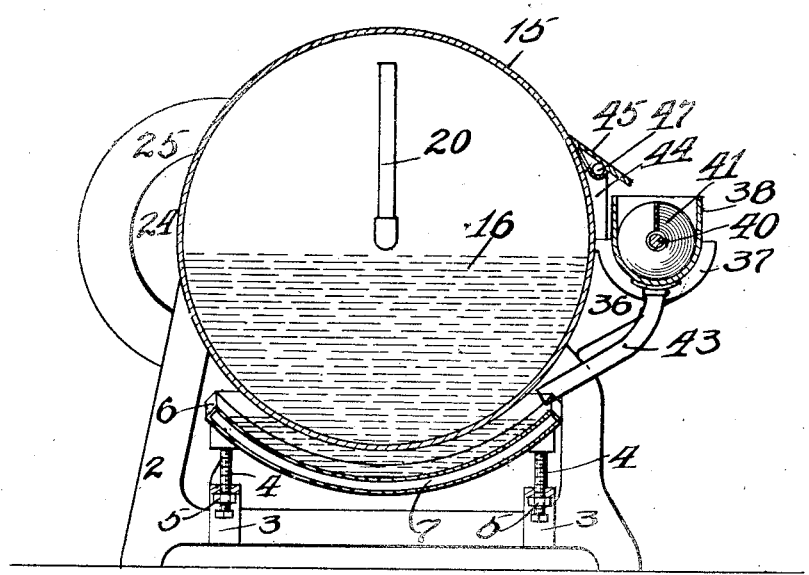

UNITED STATES PATENT OFFICE.

WILLIAM H. BIGELOW, OF CHICAGO, ILLINOIS.

REFRIGERATING-CONCENTRATOR FOR FRUIT-JUICES.

1,330,160.  Specification of Letters Patent.  Patented Feb. 10, 1920.

Application filed July 29, 1918. Serial No. 247,347.

*To all whom it may concern:*

Be it known that I, WILLIAM H. BIGELOW, a citizen of the United States, and a resident of the city of Chicago, in the county of Cook and State of Illinois, have invented certain new and useful Improvements in Refrigerating-Concentrators for Fruit-Juices; and I do hereby declare that the following is a full, clear, and exact description of the same, reference being had to the accompanying drawings, and to the numerals of reference marked thereon, which form a part of this specification.

Aqueous containing products, such as fruit juices are usually concentrated by a boiling process, which not only tends to change the natural flavor or taste of the juices, but also causes loss by evaporation of the juices with the aqueous substances.

This invention relates to a continuously operable fruit juice concentrator wherein an intermittently driven refrigerating mechanism is adapted to operate in a trough of fruit juice to concentrate the juice by mechanical refrigeration so that the natural taste or flavor of the juice is retained in the concentrated product.

It is an object of this invention to construct an intermittently rotatable refrigerating mechanism to operate in a fruit juice container to cause concentration of the juice by freezing out the aqueous substances contained in the juice.

It is also an object of the invention to provide a concentrator for fruit juices and the like, wherein a refrigerant container is intermittently rotated in a trough of fruit juice to cause the aqueous substances in the fruit juice to freeze upon the exterior of the refrigerant container and thereby concentrate the fruit juice.

Another object of the invention is the construction of a concentrator provided with a rotatable refrigerating mechanism adapted to operate in an adjustable fruit juice container to cause the water in said fruit juice to freeze upon the exterior of the refrigerating mechanism, from which it is loosened by means of steam and then scraped from said mechanism to be carried away by a conveyer.

It is a further object of this invention to construct a fruit juice concentrator adapted to be continuously operated to cause concentration of the fruit juice to any desired degree by mechanical refrigeration.

A further object of the invention is the construction of a fruit juice concentrator wherein a refrigerant container is adapted to be intermittently operated in an open fruit juice container to condense the fruit juice by causing the water therein to freeze on the exterior of the refrigerant container from which it is removed by a steam or hot water heated scraper mechanism disposed longitudinally of the container.

It is furthermore an object of the invention to provide a concentrator for aqueous products which are contained in a hollow adjustable trough to be acted upon by an intermittently operatable refrigerant container which acts to separate the aqueous substances contained in the products, to permit said substances to freeze on the exterior of said container and be removed therefrom by a steam heated scraper and deposited in a conveyer mechanism to be carried away.

It is an important object of the invention to construct a device for the preservation of fruit juices and other aqueous containing products by causing concentration by mechanical refrigeration produced by intermittently rotating a brine drum in an adjustable hollow trough containing fruit juice to cause the water in the juice to freeze upon the exterior of the drum to concentrate the juice without freezing the same, said ice on the drum adapted to be removed by a heated scraper and deposited in a conveyer, while the hollow trough is adapted to be heated when necessary to prevent solidification of the condensed fruit juice upon the inner surface of the trough.

Other and further important objects of the invention will be apparent from the disclosures in the drawings and specification.

The invention (in a preferred form) is illustrated in the drawings, and hereinafter more fully described.

On the drawings:—

Figure 1 is a top plan view of a concentrator embodying the principles of this invention.

Fig. 2 is a side elevation thereof.

Fig. 3 is a longitudinal central vertical section of the device taken on line 3—3 of Fig. 1.

Fig. 4 is an end elevation of the device showing the operating mechanisms.

Fig. 5 is a sectional view taken on line 5—5 of Fig. 2,

Fig. 6 is a detail sectional view of the Geneva gear driving mechanism, taken on line 6—6 of Fig. 1, with parts omitted.

Fig. 7 is a detail view of the discharge end of the conveyer.

As shown on the drawings:—

The reference numerals 1 and 2, indicate standards or supports which are suitably spaced apart and rigidly connected together by means of longitudinal brace bars 3. Adjustably projecting upwardly through each of the brace bars 3, and near the ends thereof are supporting screw bolts 4, adapted to be locked in an adjusted position by means of lock nuts 5. Adjustably supported upon the upper ends of the supporting bolts 5, is a long curved trough or container 6, closed at one end and open at the opposite end. The trough 6, is hollow or provided with a chamber 7, and said trough is disposed longitudinally of the machine with the end portions thereof projecting through openings provided in the standards 1 and 2. The closed or receiving end of the trough 6, is slightly higher than the discharge end to hold the trough in an inclined position. The position of the trough, however, may be adjusted by a proper adjustment of the supporting bolts. Connected in the bottom of the elevated end of the trough 6, is a steam supply pipe 8, while connected to the lower end of said trough is a discharge pipe 9, for condensed steam.

Rotatably mounted in suitable bearings 10, formed on the standards 1 and 2, are the axially passaged trunnions 11 and 12, which are integrally formed axially on the end plates 13 and 14ª, respectively, of a cylinder or drum 15. The drum 15, is disposed longitudinally between the standards 1 and 2, and is adapted to contain any suitable liquefied refrigerant 16. The refrigerant liquid is supplied to the drum through a stationary supply or inlet pipe 14, which extends axially through the trunnion 11, and has a packing 17, compressed therearound by means of a screw plug 18, engaged in the internally threaded end of said trunnion 11, to prevent leakage around the pipe 14. A control valve 19, is provided in the pipe 14. The opposite trunnion 12, has an outlet pipe 20, extending therethrough, with the inner portion thereof projecting upwardly as shown in Fig. 3. The outlet pipe 20, is also packed against leakage by means of packing 17, and a screw plug 18. The outer portion of the outlet pipe 20, is provided with a control valve 21. As described the inner portion of the outlet pipe 20, is turned upwardly so as to have the open end thereof disposed safely above the level of the refrigerant liquid in the drum and thereby obviate the liability of liquid being withdrawn therefrom, and for the further purpose of exhausting the vapor resulting from the evaporation of the refrigerant liquid from the upper part of the drum where it is rarefied or expanded to its greatest extent. The inner end of the inlet pipe 14, is turned downwardly in the drum to dip into the refrigerant liquid to prevent communication of the refrigerant vapor with the open end of said pipe 14.

Keyed or otherwise secured on the projecting end of the drum trunnion 12, is a Geneva gear 22, provided with four radical slots 23, spaced ninety degrees apart, as clearly shown in Fig. 6. The periphery of the gear 22, is in engagement with the periphery of a cam 24, which is disposed in the plane of said gear and is integrally formed or rigidly secured to the inner surface of a large guide disk or plate 25.

Formed or mounted upon the inner surface of the disk 25, is a pin or peg 26, of a diameter to permit the same to engage in the slots 23, of the gear 22, to rotate said gear. The cam 24, and the disk 25, are mounted upon a shaft or axle 27, which is rotatably supported by the standard 2. Also secured on the shaft 27, to the outside of the disk 25, is a large worm gear 28, which meshes with a worm 29, mounted on one end of a transverse shaft or driving axle 30. The driving axle 30, is rotatably supported in bearing brackets 31, formed on the outer surface of the standard 2. Keyed or otherwise secured on the other end of the driving axle 30, is a driving pulley 33, disposed adjacent thereto to receive a driving belt. Securely mounted on the outer end of the shaft 27, is a sprocket gear 34, around which a driving chain 35, is trained.

Integrally formed on the front edge or end of each of the standards 1 and 2, is a forwardly projecting bracket arm 36, provided at the outer end with a semi-circular support or holder 37. Seated securely in the curved supports 37, in front of the drum 15, is a long longitudinally disposed open conveyer trough or channel 38, closed at one end and open at the discharge end. Integrally formed or rigidly secured across the open discharge end of the conveyer trough 38, is a cross piece or bar 39. The conveyer trough is longer than the drum 15, and rotatably disposed longitudinally within said conveyer trough 38, is a conveyer shaft 40, the ends of which project through the closed end of the trough and through the cross piece 39. Integrally formed or rigidly secured on the shaft 40, within the trough 38, is a spiral feed screw 41. Secured on the end of the shaft 40, which extends through the closed end of the trough 38, is a small sprocket gear 42, around which the driving chain 35, is also trained. Connected in the bottom and near the discharge end of the conveyer trough is the upper end of a downwardly directed return pipe 43, the lower open end of which is bent inwardly and projects into the trough 6.

Mounted or integrally formed on top of each of the brackets 36, is an upwardly directed standard or support 44. Disposed longitudinally across the front of the drum 15, and above the conveyer trough 38, is a hollow inclined scraper or cleaner 45, the scraping edge of which is disposed adjacent the outer surface of said drum. Trunnions are formed on the ends of the scraper 45, and project into the supports 44, to hold the scraper in position. A spring 46, is engaged around each of the scraper trunnions and one end of each of said springs is attached to one of the supports 44, while the other end of each spring is engaged with the scraper to hold the scraping edge thereof in engagement with the outer surface of the drum 15. Projecting longitudinally through the scraper 45, and through the trunnion supports thereof is a steam pipe 47, provided with an inlet valve 48, in one projecting end, and with an outlet valve 49, in the other projecting end thereof.

The operation is as follows:

With the machine parts assembled as described and as shown in Figs. 1 and 4, a fruit juice or any other aqueous containing product is poured into the juice trough 6. By adjustment of the bolts 4, the trough 6, may be moved toward or away from the refrigerating drum 15, and said trough may also be slightly elevated at the intake end to permit the juice to flow toward the discharge end, which may be provided with any desired type of weir or removable closure plate. The inlet valve 19, is opened to permit any suitable kind of a refrigerant 16, to enter the drum 15, through the inlet pipe 14. The inner end of the inlet pipe 14, is turned downwardly into the refrigerant liquid to prevent communication of the refrigerant vapor with the open end of said pipe. The inner open end of the outlet pipe 20, is directed upwardly so as to have the open end thereof disposed safely above the level of the refrigerant liquid in the drum and thereby obviate the liability of liquid refrigerant being withdrawn therefrom. The open inner end of the outlet pipe 20, is furthermore directed upwardly for the purpose of exhausting the vapor resulting from the evaporation of the refrigerant liquid from the upper part of the drum where it is rarefied or expanded to its maximum. The outlet valve 21, in the pipe 20, is of course, open during the operation of the machine to permit escape of the refrigerant gases.

The process of preserving fruit juices by concentrating the same by mechanical refrigeration is very simple. To start the machine, the driving belt which normally is engaged around the idler pulley 33, is shifted over onto the driving pulley 32, thereby causing rotation of the axle 30, and the worm 29. The worm gear 28, being in mesh with the worm 29, is rotated thereby, thus causing rotation of the auxiliary shaft 27, and the cam 24, the plate 25 and the sprocket gear 34. Rotation of the cam 24, and the plate 25, tends to intermittently rotate the Geneva gear 22, by means of the driving pin 26, which is adapted to engage in the slots 23, of the Geneva gear. The combination cam and Geneva gear driving mechanism acts to alternately rotate and then stop the refrigerating drum 15, thereby permitting the refrigerant to act upon the fruit juice in the concentrating trough. The intermittent operation of the drum 15, is sufficient to agitate the fruit juice to cause the aqueous substances contained therein to separate therefrom and freeze on the outer surface of the drum. The fruit juice under concentration in the trough 6, is kept below the freezing point, but the trough 6, is kept slightly above the freezing point to prevent ice forming on the trough. For this purpose steam or hot water may be admitted through the pipe 8, into the chamber 7, of the trough 6, to regulate the temperature of the inner wall of the trough. The condensed steam or hot water in the chamber 7, is permitted to drain off through the outlet pipe 9.

Steam or hot water is admitted into the pipe 47, by opening the inlet valve 48. The heat from the pipe 47, acts to rapidly heat the spring controlled scraper 45, the scraping edge of which engages the surface of the drum 15. The ice or frozen substance adhering to the surface of the drum, due to the intermittent rotation of the drum are brought into contact with the heated scraper 45, which acts to loosen and scrape the ice or frozen substances off of the drum 15, and deposit the scraped ice into the open top of the conveyer trough 38. Since the conveyer sprocket gear 42, is connected by means of the chain 35, with the rotating sprocket gear 34, the conveyer shaft 40, and the spiral feed screw 41, are also caused to rotate and thereby move or convey the ice deposited in the conveyer trough 38, out through the open discharge end thereof. Any of the unfrozen fruit juice which may be carried upwardly around the intermittently rotating drum 15, and deposited into the conveyer 38, is returned to the concentration trough 6, through the return pipe 43, which may be provided with suitable screens to prevent the same from clogging.

The process of concentration of the fruit juice in the trough 6, may be continued without interruption until any desired degree of concentration of the fruit juice is obtained. When the fruit juice has been sufficiently concentrated, the operation of the machine is stopped by throwing the driving belt from the pulley 32, back onto the idler pulley 33. The weir or removable end piece in the discharge end of the concentration trough 6, may be lifted or removed to permit the concentrated product to flow from the trough into suitable receptacles disposed below the discharge end thereof for the purpose. The concentration of the fruit juice by mechanical refrigeration does not cause waste of the fruit juice by evaporation, but preserves not only the fruit juice, but also permits the same to retain its natural flavor and taste.

I am aware that many changes may be made and numerous details of construction may be varied through a wide range without departing from the principles of this invention, and I therefore do not purpose limiting the patent granted, otherwise than necessitated by the prior art.

I claim as my invention:—

1. A preserving machine embracing an adjustable fruit juice trough, a refrigerant drum disposed thereabove, and mechanisms connected with said drum for intermittently rotating the same to cause concentration of the fruit juice by mechanical refrigeration.

2. A preserving machine embracing an adjustable fruit juice trough, a refrigerant drum disposed thereabove and projecting therein, mechanisms connected with said drum for intermittently rotating the same to cause concentration of the fruit juice in said trough by separating and freezing the aqueous substances from said fruit juice, and means for heating said trough when necessary to maintain its temperature above freezing.

3. In a concentrator of the class described, a fruit juice container, a refrigerant containing drum disposed thereabove, means for alternately rotating and stopping said drum to permit the aqueous matter in said fruit juice to freeze onto said drum leaving the concentrated fruit juice in said container, and means for scraping said frozen aqueous matter from said drum during the operation thereof.

4. In a concentrator of the class described, a fruit juice container, a refrigerant containing drum rotatably mounted thereabove and projecting therein, mechanisms connected with said drum for rotating the same in said container to agitate the fruit juice and permit the water therein to freeze onto the outer surface of said drum and heated scraper for removing the ice from the drum.

5. In a concentrator of the class described, a container for holding an aqueous containing product, a refrigerated drum disposed thereabove and projecting therein, mechanism for rotating said drum intermittently to agitate the product and permit the aqueous matter therein to freeze on the drum and thereby concentrate the product, means for scraping the ice from the drum, and means for heating said scraper means to loosen the ice to facilitate removal thereof.

6. In a concentrating device of the class described the combination with a fruit juice trough, means for adjusting the same, a refrigerating drum disposed above said trough and projecting thereinto, means connected with said drum for admitting a refrigerant thereinto and allowing the gases from said refrigerant to escape from said drum, mechanisms connected with the drum for rotating the same to cause agitation of the fruit juice and permit the water in said fruit juice to freeze onto the drum and thereby concentrate the fruit juice, means for heating the trough when necessary to maintain the temperature of the condensing fruit juice above freezing, a heated scraper disposed to engage said drum to scrape the ice therefrom, a conveyer disposed below said scraper to receive the ice and convey the same away, and means connected with said conveyer to permit return to said trough of any of the concentrated fruit juice which may be carried by said drum and deposited into said conveyer.

7. In a concentrator for aqueous liquids such as fruit juices, a fruit juice trough, an intermittently rotatable refrigerating drum disposed thereabove and projecting thereinto, means projecting into said drum to deliver a refrigerant therein, and outlet means connected with said drum to permit flow of the refrigerant therethrough, said drum adapted to cause concentration of the fruit juice in said trough by freezing the aqueous matter from said fruit juice while said concentrated juice is maintained at a temperature below 0° C. in said trough, and means maintaining said trough slightly above freezing.

8. A concentrator embracing an adjustable fruit juice container, an intermittently rotatable refrigerator engaged therein to cause the water from said fruit juice to freeze upon the refrigerator and thereby concentrate the fruit juice, and means for removing the ice from the refrigerator during the operation thereof.

In testimony whereof I have hereunto subscribed my name in the presence of two subscribing witnesses.

WILLIAM H. BIGELOW.

Witnesses:
EARL M. HARDINE,
CHARLES W. HILLS, Jr.